Sept. 20, 1960 A. C. ROBERTSON ET AL 2,953,321
VERTICAL TAKE-OFF FLYING PLATFORM
Filed Feb. 27, 1956 5 Sheets-Sheet 5

INVENTORS.
ARTHUR C. ROBERTSON
JOSEPH STUART III
BY ROBERT A. WAGNER

ATTORNEYS

United States Patent Office

2,953,321
Patented Sept. 20, 1960

2,953,321

VERTICAL TAKE-OFF FLYING PLATFORM

Arthur C. Robertson and Joseph Stuart III, Palo Alto, and Robert A. Wagner, Redwood City, Calif., assignors to Hiller Helicopters, Palo Alto, Calif., a corporation of California Filed Feb. 27, 1956, Ser. No. 568,065

4 Claims. (Cl. 244—23)

This invention relates generally to ways and means for propelling a person through the air in controlled flight. More particularly the invention provides a wingless aircraft propelled by thrust reaction and capable of vertical ascent for take off and climbing, hovering in the air, horizontal flight, and vertical descent under such conditions that directional control, and transition from vertical to horizontal flight and vice versa are effected by body movements or balance of the pilot flying the machine.

The invention, in common with conventional helicopters, achieves vertical ascent and descent by vertically applied forces. However, the invention applies the lifting force from beneath the flyer as opposed to the helicopter which lifts from above.

The invention provides a wingless aircraft propelled by thrust generated by engine-driven high speed counter-rotating propellers positioned transversely in an open ended generally tubular propeller housing which forms a so-called propeller shroud. Such propellers which may be termed shrouded propellers, are positioned below the feet of a standing pilot to thereby create an air column flowing generally parallel to the longitudinal axis of the pilot's body. In other words, the pilot is actually supported by the air column generated by the shrouded propellers. In this connection it is to be noted that the propeller shroud is important because it increases the efficiency of the propellers by minimizing contraction of the slip stream as it passes over them thus insuring a fuller air column for support.

In the invention, additional or augmented lift and propulsion is obtained through use of a smoothly outwardly flared air foil shaped inlet duct portion forming a functionally integral part of the propeller housing or shroud and over the edges of which air flows as it passes into such propeller shroud. Such an inlet duct further increases or augments the efficiency of the propellers to increase the lift by insuring a smooth flow of incoming air and a uniformly full air column generated by the propellers. Thus, the inlet duct portion of the shroud is important in maintaining the air column to be substantially equal in diameter to the propeller diameter rather than contracting as it passes through the rotating propellers as would be the case if no such smoothly flared inlet were used.

Torque effect control is attained by utilizing counter-rotating propellers so that torque is substantially neutralized by maintaining substantially equal power input to each propeller. Additional control of bodily movement of the aircraft is obtained by adjustable vanes deflectable against the air column without altering the general axial direction of flow of the air column as a whole through the propeller housing. In other words, the body of the air column always flows in the same general axial direction, the vanes merely reacting against the air column to control bodily movement of the aircraft for stability. A type of such bodily movement control in the embodiment illustrated is the control of yaw or turning of the aircraft by adjustable control surfaces or vanes positioned in the air column which mechanically effect turning of the craft about its vertical axis.

The pilot is supported by standing on a table-like station positioned adjacent the upper or inlet end of the propeller housing above the counter-rotating propellers so that all thrust forces are directed in an upward direction to propel him through the air. Direction of flight control, that is, the transition from vertical to horizontal or lateral flight as well as change in direction of flight is effected by the pilot's balance which tips the craft in the direction in which he desires to fly. Such tipping tilts both the craft and the air column thus introducing a horizontal thrust component which drives the craft in the direction of tilt.

Ascent and descent of the craft are controlled by regulation of thrust generated by the shrouded counter-rotating propellers and this is suitably accomplished by regulating the power input to the propellers either by regulating the speed (r.p.m.) of the engines driving such propellers, or if variable pitch propellers are employed, by regulation of the engine in combination with the propeller pitch both of which may be accomplished in accordance with conventional practice. Such regulation is effected by pilot operable controls to accomplish the desired results. In this connection, it will be noted that fixed pitch propellers are desirable for their lightness and relative inexpensiveness.

In flight, hovering will require less power than ascent, but more than descent; and a decreased load due to fuel consumption or jettisoning of cargo will require a power adjustment. In connection with power regulation, it will be noted that when the craft is tilted for lateral flight the thrust forces thus are split, part only being available for support and the remainder being used for horizontal propulsion. However, there will not always be a corresponding decrease in lift. This is so because forward speed will cause more air to pass through the propeller shroud thus further increasing the propeller efficiency and providing added or augmented thrust. Part of such added thrust is available as vertical thrust for lift and will at some air speeds more than offset the loss of vertical thrust due to tilting of the craft. At other speeds, the thrust gained will equal that lost; and still other speeds (i.e. higher speeds where the craft is tilted farther), the thrust gained may be less than that lost. Obviously, suitable power adjustments may be made to compensate for such gains or losses in vertical thrust to maintain a desired altitude.

As the degree of tilt increases, so does the horizontal force component and resulting lateral speed. Thus, it may be stated that the pilot's balance, in addition to controlling direction of flight of the aircraft, also regulates its lateral or horizontal speed because forward speed increases with increased tilt and vice versa. Of course, the power input must be sufficient so that the vertical force component provides sufficient vertical thrust to support the craft at a desired altitude.

Since the craft derives its support in flight from thrust of the air column generated by the shrouded propellers, it should be flown at all times in such an attitude that there is a vertical thrust component to support the craft and maintain its altitude. Thus, in forward flight the longitudinal axis of the craft (i.e. the axes of the propeller shafts) will not be parallel to the ground. That is to say, the craft will not be tilted a full 90 degrees from the vertical as that would result in complete loss of vertical thrust component and the craft would fall to the earth unless other lift means sufficient to support it are employed.

Due to its inherent characteristics, the craft possesses positive static stability in flight. This is so because as the forward airspeed increases there is a marked increase in the value of the nose up pitching moment. On the other hand, there is a decrease in such moment with increased angle of attack or tilt. Thus, increasing the tilt decreases the nose up moment, but at the same time the resulting increased air speed tends to increase the nose up moment and offset the effect of increased tilt.

In summary, the invention provides a compact wingless flying craft driven by thrust reaction and capable of vertical ascent and descent as well as hovering and stable horizontal flight all of which are simply controlled by the pilot, with thrust control being effected by pilot control of power input, yaw or direction of facing control being effected by pilot controlled mechanically operated vanes, and control of the direction of flight as well as airspeed being effected by balance of the pilot which balance controls the degree of tilt of the aircraft without complicated control systems.

The craft thus comprises a pilot supporting station positioned adjacent the inlet end of a columnar or cylindrical propeller housing or shroud in which are positioned two axially aligned engine driven counter-rotating propellers having common axes of rotation substantially parallel to the longitudinal or normally vertical axis of the propeller shroud. An outwardly flared air foil shaped inlet is desirably provided at the upper or inlet end of the propeller housing to insure a full flow of air into and through such housing from top to bottom to thereby augment the lift by insuring a uniformly full air column across the propellers. Torque is substantially neutralized by counter-rotation of the propellers while residual or non-neutralized torque is compensated for by pilot operated yaw control vanes mounted on the aircraft and positioned in the air column to turn the craft by deflection. Pilot operated means control the engine power output to regulate the quantity of thrust, and thus the ascent, descent and horizontal speed of the craft.

Since the craft is primarily controlled in flight by balance, it is desirable that its center of gravity be positioned at or near the longitudinal axis of the craft so that no substantial pilot effort is required to overcome inherent unbalance. Also, it is desirable that the pilot station be suitably secured to the aircraft so that the craft will tilt in response to the pilot's direction of leaning.

Due to its compactness, the craft is capable of operation in relatively confined areas beneath and around trees and power lines and is particularly well adapted for close-in military maneuvers.

More specific objects and advantages of the invention will appear from the following detailed description of a preferred embodiment of the invention shown in the accompanying drawings which form a part of this specification.

As shown in the drawings, the craft comprises a generally vertical open ended propeller housing 10 which provides the body chassis of the aircraft upon which all other parts of the aircraft are supported. The housing 10 is made up from a short or ring-like lower cylindrical section 11 to which is secured an upwardly and outwardly flared inlet duct 12 having a smoothly turned under lip 13 which insures a smooth air flow into the propeller housing. The outwardly flared inlet duct is reinforced with stiffening ribs 13' on its outer surface.

Thrust is generated by axially aligned counter-rotating conventional twisted fixed-pitch propellers 14 and 14' mounted on co-axial shafts 16 and 16' and positioned transversely in the lower cylindrical section 11 of housing or shroud 10. Since the propellers rotate in opposite directions, they are of opposite pitch. Driving of the propellers is effected by engines 17 and 17' which transmit rotation to the co-axial shafts 16 and 16' by means of pulleys 18 and 18' mounted on the engines and connected by V-belts 19 and 19' to pulleys 21 and 21' mounted respectively on the shafts 16 and 16'. In this connection, it is to be noted that instead of the two engines illustrated, only a single engine or more than two engines may be employed. Also other known transmission arrangements may be utilized to drive the shafts 16 and 16'. Two engines are employed in the embodiment of the invention illustrated merely because of the commercial availability of separate engines to provide the horsepower for the weight of the craft.

To obtain maximum efficiency of propellers in the housing, the propeller diameters should be as close as possible to the inner diameter as the cylindrical section in which they are positioned with just sufficient clearance to avoid hitting the walls of the housing with propeller tips. A clearance on the order of $\frac{1}{16}''$ between propeller tips and the housing inner wall is desirable. However, the exact clearance used will depend upon the vibration of the propellers in flight and will be selected to accommodate such vibration.

A common fuel tank 22 serves both engines and simultaneous control of engine speed is effected by a single rotatable throttle handle 23 as hereinafter explained, and the speed of the engines or propellers may be indicated by a conventional tachometer 23' suitably connected to the engines or propellers for sensing their speeds.

Figure 1:
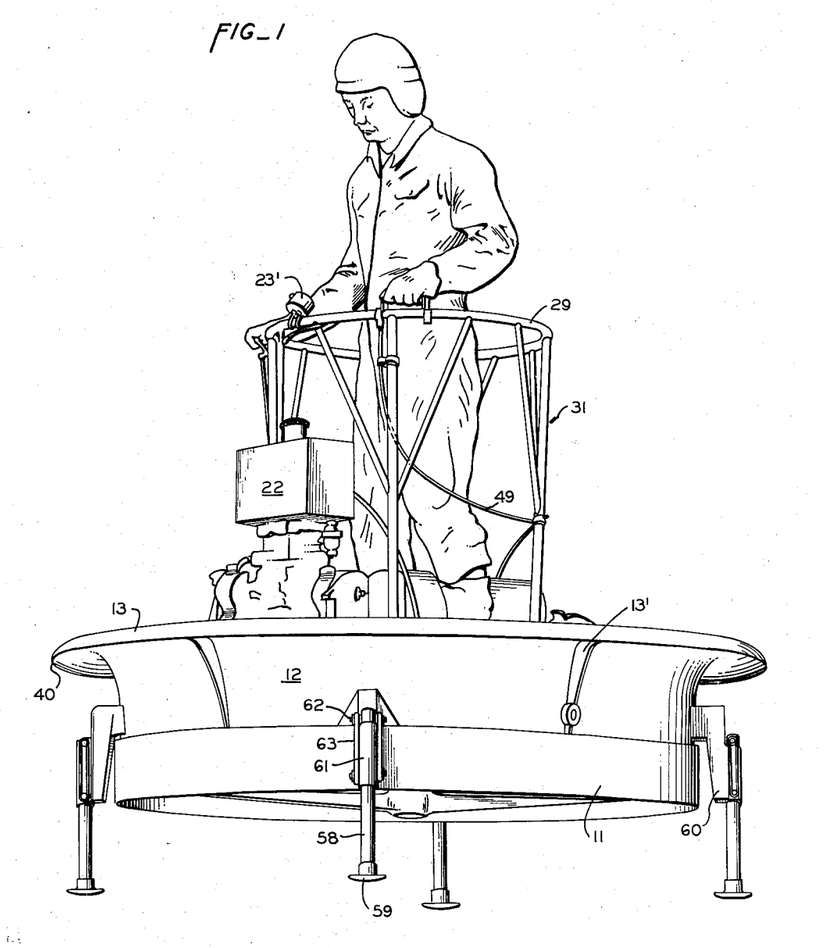
Fig. 1 is a perspective view of the craft with pilot, the craft being shown in the vertical position as in vertical flight or hovering.
Figure 2:
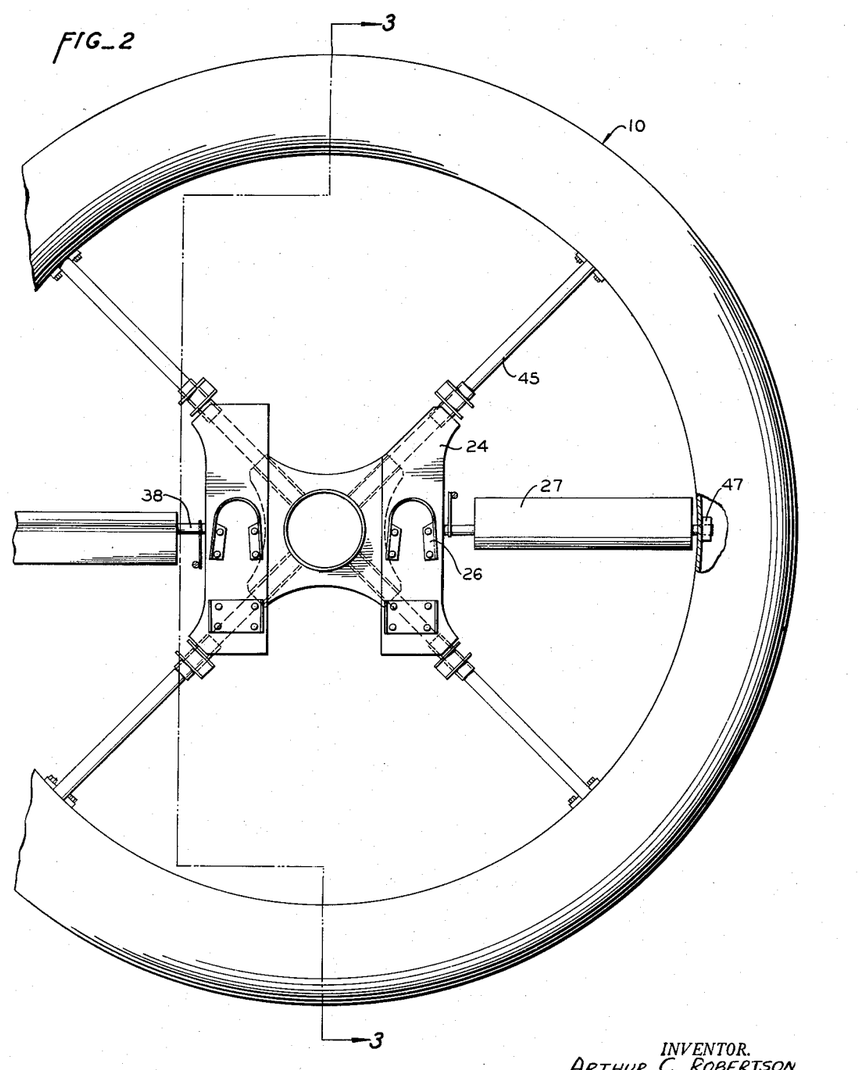
Fig. 2 is a fragmentary top elevational view of the propeller shroud illustrating the flared inlet portion and showing structural braces, pilot's platform, and yaw control vanes positioned in the shroud; a portion of the view being broken away to shorten the same and some of the structure being omitted for purposes of clarity.

As shown in Fig. 2, pilot support is provided by a small platform or table-like structure 24 having foot braces 26 in which the pilot's feet may be strapped by conventional bindings (not shown).

Since the fixed pitch propellers 14 and 14' are driven in counter-rotation at approximately the same speed, the torque effect is substantially eliminated. Thus, there is little tendency for the craft to yaw or roll about its longitudinal axis in opposition to rotation of the propellers. However, there may be some torque effect due to the engines being out of synchronization and this may be minimized with a single engine and conventional coordinated equal speed drive to the propellers.

The above mentioned torque is mechanically compensated for by pilot operated yaw control vanes 27 positioned in the housing 10 above the propellers in the slip stream being drawn through the propeller housing by the propellers 14 and 14'. As hereinbefore mentioned, such vanes are mounted to controllably deflect the slip stream in a direction determined by rotation of the vanes. However, as mentioned previously, the vanes react against the air column or slip stream without altering the general direction of axial flow of such column, as a whole, through the propeller housing. Thus, the vanes provide means for mechanically turning the craft in flight so that the pilot can face in the direction of tilt which corresponds to the direction of flight. Also it is not necessary that such vanes be positioned above the propellers, as they may be positioned anywhere in the air stream so long as they are fastened to the housing or other part of the aircraft, out of the plane of rotation of the propellers, so that deflection of such vanes by the air stream will rotate the aircraft.

Figure 3:
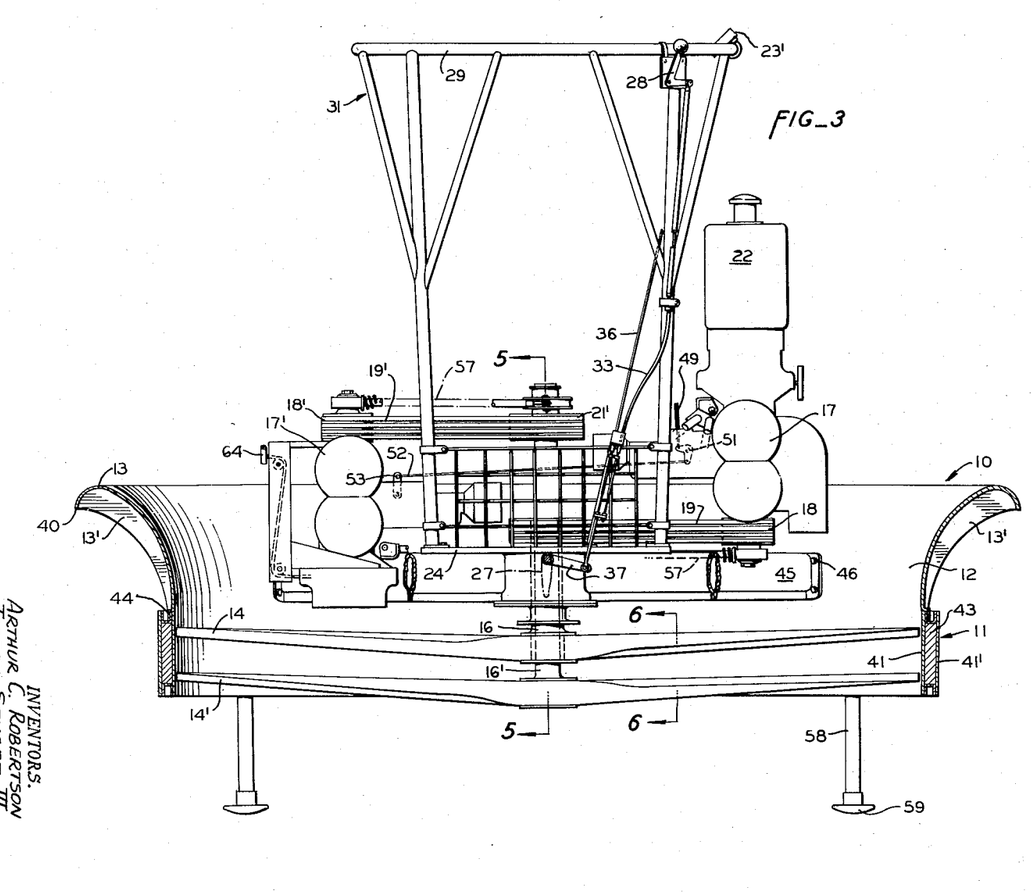
Fig. 3 is a sectional elevational view of the complete craft taken in planes indicated by line 3—3 of Fig. 2 showing details of construction, the pilot being omitted. A yaw control vane is indicated in phantom lines to illustrate its position relative to the propellers.
Figure 4:
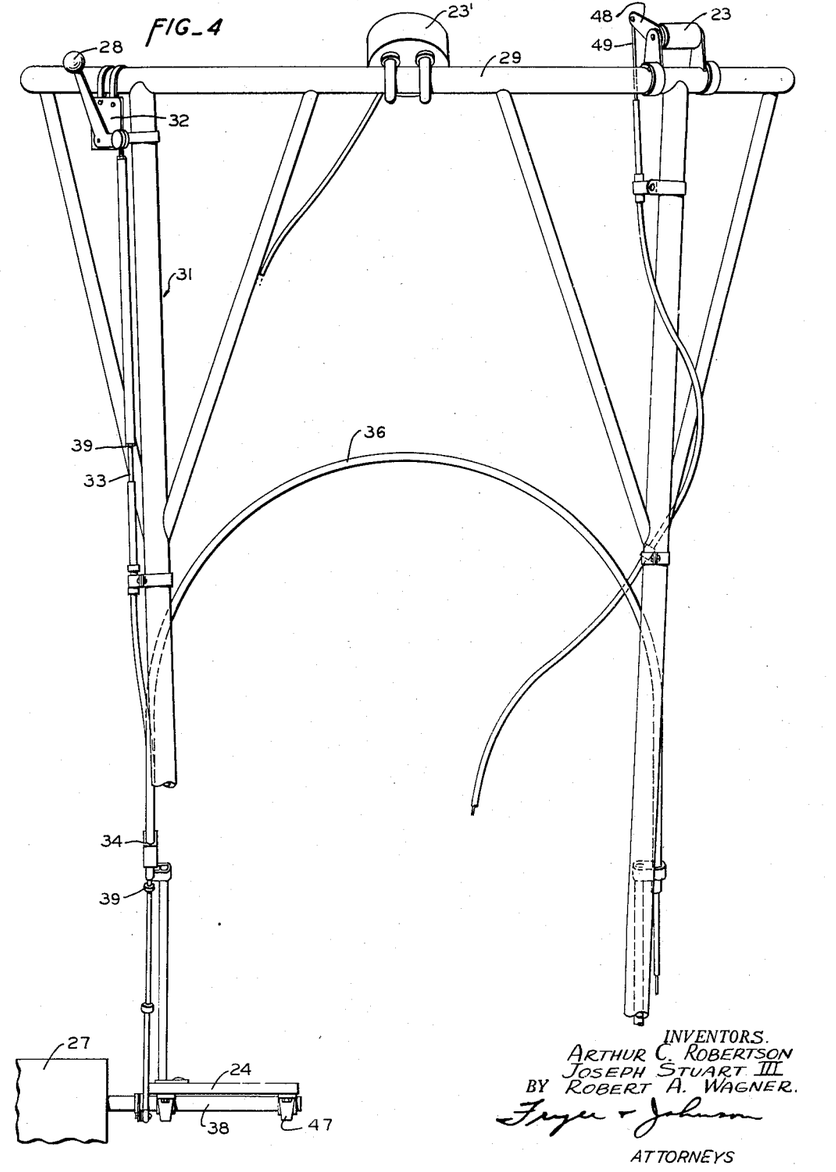
Fig. 4 is a fragmentary sectional elevational view of the frame assembly in which the pilot stands showing location of the pilot operated throttle and yaw controls, other parts being omitted for clarity.

As best shown in Figs. 3 and 4, the yaw control vanes are pilot controlled by means of a control handle 28 mounted on the top ring 29 of the frame 31 in which the pilot stands.

Pilot operated yaw control handle 28 comprises a simple bell crank mounted on a bracket 32 fastened to the frame ring 29. Movement of vanes 27 for yaw control is effected in a known manner through a conventional Bowden cable 33 connected at one end to control handle 28 and at the other end to an intermediate point 34 (Fig. 4) on a second Bowden cable 36 which has its opposite ends connected to levers 37 fixed on shafts 38 on which the yaw control vanes 27 are mounted. Thus, movement of the pilot operated control handle 28 moves first cable 33 which in turn moves second cable 36 thereby effecting simultaneous displacement of levers 37 and rotation of the vanes 27.

It will be noted that the vanes 27 are positioned transverse of the housing 10, are in substantial alignment with each other, and are so mounted (Fig. 2) that they rotate in opposite directions with movement of control handle 28. Thus, such vanes 27 act in a manner analogous to opposite blades of a variable pitch propeller and provide an air screw which upon deflection by the air stream will rotate (yaw) the craft about its longitudinal axis.

The direction of rotation of the craft is dependent upon the direction and degree of displacement of the control vanes 27 from the neutral or vertical position (0° displacement). However, the vanes need not be capable of rotation to the horizontal position (90° displacement) but are desirably limited by stop nuts 39 (Fig. 4) which limit travel of cable 36 to a displacement of about 15° on either side of the vertical as this will give ample control and avoid inadvertent violet overcontrol. It should be noted, however, that the vanes are relatively narrow, even across their substantially flat faces (see Fig. 2), and even if permitted to rotate to a position wherein the substantially flat faces are normal to the axis of the housing 10 the vanes occupy only a minor portion of the cross-sectional area defined by the wall of the housing. That is, the vanes in such position deflect only a portion of the air column produced by rotation of the propellers but do not cut off entirely such air column or alter its general axial direction of flow through the housing 10. The vanes, being substantially vertical in normal or central operation, will not upset the smoothness of the incoming air stream nor present excessive drag.

The propeller shroud 11 with its flared air inlet portion 12 is important because it produces a smoothly flowing air stream and avoids construction of such air stream as it passes the propellers. The propeller shroud also affords safety to persons in and around the craft by shielding them from open propellers. If desired, additional safety may be afforded by positioning a grid on the top and bottom of the housing or the lower cylindrical portion 11 thereof in which the propellers are positioned. Since the shroud provides increased propeller efficiency, it enables employment of relatively small diameter propellers and thus further contributes to compactness of the craft.

The inlet duct portion 12 of the housing, which substantially surrounds the pilot's station 24, directs incoming air smoothly into the cylindrical portion 11 where the propellers are and thus minimizes undesirable turbulence which might cause stalling of the propeller blades and result in non-uniform thrust from the air stream. In this connection, it is noted that the air foil characteristics of the flared inlet portion 12 are selected in accordance with conventional practice to insure smooth non-turbulent flow of air thereacross. It will further be noted that the upper lip 13 has a rounded downwardly extending edge portion 40 for the purpose of minimizing possible turbulence of incoming air in various flight attitudes. Thus, the inlet 12 and the lip 13 together form a substantially continuous outwardly flared surface extending upwardly from the cylindrical section 11 to provide a maximum inside diameter at the top of the housing 10 and this is what insures a smooth air inflow and uniformly full air stream.

In the embodiment of the invention illustrated, as best shown in Fig. 3, the cylindrical section 11 and inlet section 12 making up the complete housing 10 are separate pieces positioned in substantial alignment with each other. The lower cylindrical section 11 comprises two concentric cylindrical sections 41 and 41' desirably of light metal, such as aluminum, which together with channel members 42 define an annular chamber which is filled with a light weight rigid material 43 such as polystyrene or other synthetic resins or fabric materials cemented to the cylindrical members 41 and 41' thereby making the section relatively rigid without sacrifice as to lightness. A single sheet of relatively rigid plastic, such as resin impregnated fibreglass or light metal, makes up the upper inlet duct member 12. Such inlet 12 is superimposed on the lower cylindrical section 11 in substantial alignment with the wall of the inner section as an upward extension thereof to provide a continuous smooth wall. As shown, the inlet 12 and lower cylindrical section 11 are joined in a known manner by means of an offset vertical flange 44 on the lower edge of the inlet section 12 which is riveted or otherwise joined to lower cylindrical section 11.

Essentially, the craft comprises two major parts, the housing or shroud including the cylindrical section and flared inlet section; and the power assembly, including the engines, propellers and pilot's station. The power assembly is positioned in the housing and held in place by transverse support beams or columns 45 which provide support for the power assembly and impart rigidity to the housing. Desirably such beams 45 are streamlined to insure a smooth flow of air thereacross and are made of tubular light weight metal, preferably aluminum, construction to minimize weight. Such beams are secured to the housing 10 in conventional manner as by bolts 46. The pilot's station, engines and accessories are suitably mounted on the transverse beams 45.

In this connection, it will be noted that the shafts 38 on which the vanes 27 are mounted are journalled under the pilot's station 24 and at the wall of the inlet duct 12 in suitable bearings 47 in conventional manner as illustrated in Figs. 2 and 4.

The throttle controls the speed of both engines simultaneously thereby keeping them in synchronization at substantially equal speeds. The throttle assembly comprises a rotatable hand grip 23 mounted on the top ring 29 of the frame. Attached to one end of such grip 23 is a lever arm 48 to which is attached one end of a Bowden cable 49 leading to a conventional bell crank 51 mounted on the first engine 17. The bell crank 51 on the first engine is connected by a shaft 52 to a lever 53 on the second engine 17'. Bell crank 51 and lever 53 are engine controls and, in the arrangement shown, are simultaneously controlled by the throttle grip 23. If desired, the engines and the yaw vanes may be all regulated from a single control, thus leaving one of the pilot's hands free at all times. Such a single control arrangement may be provided by a conventional mechanism (not shown) in which movement of the control handle in one direction operates one controlled member, such as the engines, while movement of the handle in another direction operates a second controlled member, in this case, the yaw control vanes. Also separate throttle controls for each engine may be employed if desired. A conventional tachometer 23' is employed for indicating r.p.m. and is mounted on the ring 29 adjacent the throttle for easy reading by the pilot.

Figure 5:
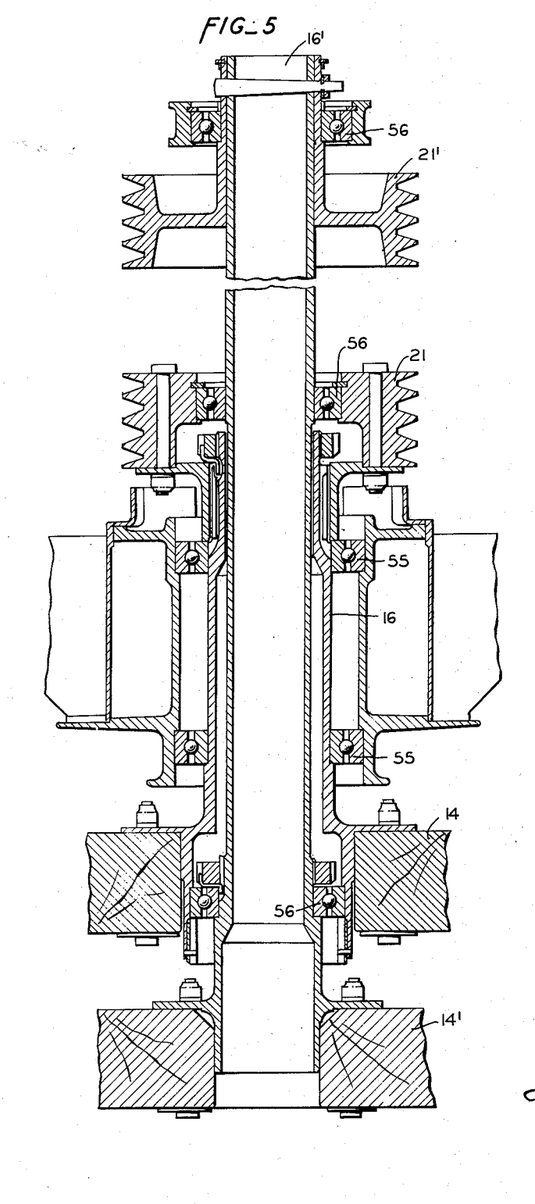
Fig. 5 is a sectional view taken in the plane of line 5—5 of Fig. 3 showing details of the co-axial propeller shafts and bearings. The view is enlarged for clarity.

As is usual with axially aligned propellers, the shafts 16 and 16' driving propellers 14 and 14' are suitably journalled and supported in conventional bearings 55 and 56 as shown in Fig. 5. Tension is maintained on the V-belts driving the shafts by means of conventional spring loaded bars such as 57 shown in phantom lines in Fig. 3.

A resilient landing gear to absorb landing shocks and support the craft on the ground is provided by four tubular struts 58 having foot caps 59 and mounted on equally spaced brackets 60 attached to the outside of the housing 10. In order to provide resiliency for absorbing landing shocks, the landing gear struts 58 pass in sliding relationship through tubular sections 61 on the brackets 60. To provide for such shock absorbing, each landing gear strut 58 is equipped at the top with a pair of lugs 62 while the brackets 60 are each provided with a similar lug 62 at the bottom. Bungee cord 63, or similar tough elastic material, is stretched between lugs on the landing gear strut 58 and lugs on the bracket 60. Tension of such bungee cord normally holds the landing gear struts in the down position. However, upon landing the bungee cords stretch, permitting the landing gear struts to slide through tubular sections 61 of the bracket so that landing shocks are absorbed by stretching of the bungee cords. Obviously, known hydraulic shock absorbers may be employed on the landing gear instead of the arrangement shown, but the ones illustrated are selected because of simplicity of construction and lightness.

Figure 6:
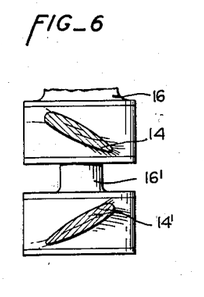
Fig. 6 is an end sectional view of the propeller blades taken in the plane of line 6—6 of Fig. 3.

Although the craft of this invention is extremely light and may be driven by relatively small engines, it possesses a high work factor for its weight. Illustratively, a craft was constructed having a 5 foot inside diameter in the lower cylindrical portion 11, a total housing height of 17 inches, and other dimensions as indicated in the drawings which are substantially to scale. Such craft was powered by two 40 horsepower internal combustion engines each weighing about 50 pounds including accessories. Conventional twisted fixed pitch propellers 14 and 14' were employed, of opposite pitch to each other (Fig. 6), and of a diameter only $\frac{1}{16}$" less than the inside diameter of the cylindrical shroud portion 11 in which they were mounted. The entire craft, without fuel, weighted only about 254 pounds total, yet it lifted an additional 246 pound load, or 500 pounds total weight. In flight the engines were operated in the range from about 3500 r.p.m. to 3700 r.p.m. which rotated the propellers at from about 2450 r.p.m. to 2600 r.p.m.

To fly the craft, the throttle is opened until vertical ascent begins, then power is applied as required to attain the desired altitude. If hovering is desired, the throttle is adjusted so that the thrust reaction of the air stream just supports the craft.

Lateral or horizontal flight is achieved by leaning in the desired direction which will tilt the craft and the air stream so that the horizontal component of the thrust stream effects horizontal propulsion. For ease of control and maneuverability, the degree of tilt should not exceed about 30° as that will give comfortable control and a sufficiently broad speed range for most purposes. Rotation of the craft to face in the direction of flight is effected by yaw control vanes 27 as explained above.

In flight the top ring 29 on the frame 31 surrounding the pilot is useful in direction of flight and airspeed control because it gives the pilot a support which he may lean against to attain high angles of tilt. If the pilot desires to move forward then, just as in walking, his natural tendency is to shift his weight forward. This will tilt the craft forward whereupon the air column is tilted and thrust reaction propels the craft forward. Conversely, to stop forward motion, the pilot naturally shifts his weight backwardly, which tilts the craft to neutral and eliminates the horizontal thrust component. Similarly, weight shifts to the side will move the craft sideways. In short, the pilot's natural balance, or control of his own center of gravity in accordance with desired changes in direction, will effect directional control of the craft.

Descent and landing are accomplished by retarding throttle to decrease thrust and permit the craft to settle.

Although the embodiment shown employs standard piston type engines (17 and 17') started by means of a conventional pull cord starter 64, it is to be understood that various type engines may be employed and, if desired, other starting means may be utilized.

We claim:

1. A wingless and tailless aircraft comprising a main body chassis consisting of a single generally open ended tubular propeller housing having an upper air intake end defined by a substantially annular lip, a plurality of propellers mounted for rotation in said housing about the axis thereof, a pilot supporting station carried by said housing above said propellers and extending across said axis whereby a pilot supported on said station is in substantial alignment with said axis, a frame extending upwardly from said housing beyond said housing lip for engagement by said pilot whereby said pilot may steady and support himself during flight, means for driving said propellers in counter rotation to effect flow of an aircraft supporting air column generally axially through said housing and to substantially neutralize torque whereby directional control of said aircraft is obtained by said pilot tilting said housing by shifting balance of his body on said station without altering the general location of his body with reference to said housing axis so that said pilot need not leave said station while controlling flight of said aircraft, and additional means for controlling said aircraft independently of pilot balance and without altering the general axial direction of flow of said air column comprising vanes mounted for turning about axes transverse to said housing axis and reactable against said air column, said vanes being relatively widely spaced apart and of such size that when turned to any adjusted position they remain widely spaced apart so as to occupy a minor portion of the cross-sectional area defined by said housing.

2. A wingless and tailless aircraft comprising a main body chassis consisting of a single generally open ended tubular propeller housing having a generally cylindrical lower section and an upwardly and outwardly flared upper section which defines a substantially annular lip, the major diameter of said housing being materially in excess of the over-all height of said housing to impart a short ring-like configuration thereto, a plurality of propellers mounted in said cylindrical section adjacent a lower end thereof for rotation about the axis of said housing, a pilot supporting station carried by said housing above said propellers and extending across said axis whereby a pilot supported on said station is in substantial alignment with said axis, means for driving said propellers in counter rotation to effect flow of an aircraft supporting air column generally axially through said housing and to substantially neutralize torque whereby directional control of said aircraft is obtained by said pilot tilting said housing by shifting balance of his body on said station without altering the general location of his body with reference to said housing axis so that said pilot need not leave said station while controlling flight of said aircraft, and additional means for controlling said aircraft independently of pilot balance and without altering the general axial direction of flow of said air column comprising vanes mounted for turning about axes transverse to said housing axis and reactable against said air column, said vanes being relatively widely spaced apart and of such size that when turned to any adjusted position they remain widely spaced apart so as to occupy a minor portion of the cross-sectional area defined by said housing.

3. A wingless and tailless aircraft comprising a main body chassis consisting of a single generally open ended tubular propeller housing having a generally cylindrical lower section and an upwardly and outwardly flared upper section which defines a substantially annular lip, the major diameter of said housing being materially in excess of the over-all height of said housing to impart a short ring-like configuration thereto, a plurality of propellers mounted in said cylindrical section adjacent a lower end thereof for rotation about the axis of said housing, a pilot supporting station carried by said housing above said propellers and extending across said axis whereby a pilot supported on said station is in substantial alignment with said axis, a frame extending upright from said station and extending above said lip for engagement by said pilot whereby said pilot may steady and support himself during flight, means for driving said propellers in counter rotation to effect flow of an aircraft supporting air column generally axially through said housing and to substantially neutralize torque whereby directional control of said aircraft is obtained by said pilot tilting said housing by shifting balance of his body on said station without altering the general location of his body with reference to said housing axis so that said pilot need not leave said station while controlling flight of said aircraft, and addtional means for controlling said aircraft independently of pilot balance and without altering the general axial direction of flow of said air column comprising vanes mounted for turning about axes transverse to said housing axis and reactable against said air column, said vanes being relatively widely spaced apart and of such size that when turned to any adjusted position they remain widely spaced apart so as to occupy a minor portion of the cross-sectional area defined by said housing.

4. A wingless and tailless aircraft comprising a main body chassis consisting of a single generally open ended tubular propeller housing having an upper air intake end defined by a substantially annular lip, a plurality of propellers mounted for rotation in said housing about the axis thereof, a pilot supporting station carried by said housing above said propellers and extending across said axis including a bottom platform and means on said platform for locating a pilot in substantial alignment with said axis when a pilot is supported on said platform during operation of said aircraft, a frame extending upwardly beyond said housing lip for engagement by said pilot whereby said pilot may steady and support himself during flight, means for driving said propellers in counter rotation to effect flow of an aircraft supporting air column generally axially through said housing and to substantially neutralize torque, the center of gravity of said aircraft being located substantially on said housing axis whereby directional control of the aircraft is obtained by said pilot tilting said housing by shifting his balance on said platform without altering the general location of his body with reference to said housing axis so that said pilot need not leave said station while controlling flight of said aircraft, additional means for controlling said aircraft independently of pilot balance and without altering the general axial direction of flow of said air column comprising vanes mounted for turning about axes transverse to said housing axis and reactable against said air column to effect turning of said aircraft about said housing axis, and control mechanism mounted on said frame for engagement by said pilot whereby operation of said propellers may be regulated by said pilot as desired during flight.

References Cited in the file of this patent

UNITED STATES PATENTS

| | | |
|---|---|---|
| 1,123,589 | Porter | Jan. 5, 1915 |
| 1,440,242 | Porter | Dec. 26, 1922 |
| 1,692,397 | Wagner | Nov. 20, 1928 |
| 2,461,435 | Newmann | Feb. 8, 1949 |
| 2,828,929 | Lippisch | Apr. 1, 1958 |

FOREIGN PATENTS

| | | |
|---|---|---|
| 134,416 | Great Britain | Dec. 19, 1928 |

UNITED STATES PATENT OFFICE

CERTIFICATE OF CORRECTION

Patent No. 2,953,321  September 20, 1960

Arthur C. Robertson et al.

It is hereby certified that error appears in the printed specification of the above numbered patent requiring correction and that the said Letters Patent should read as corrected below.

Column 5, line 46, for "violet" read -- violent --; line 63, for "construction" read -- contraction --.

Signed and sealed this 11th day of April 1961.

(SEAL)
Attest:

ERNEST W. SWIDER
Attesting Officer

ARTHUR W. CROCKER
Acting Commissioner of Patents